(12) United States Patent
McKay, Jr.

(10) Patent No.: US 6,515,619 B1
(45) Date of Patent: Feb. 4, 2003

(54) OBJECT LOCATION SYSTEM

(76) Inventor: Nicholas D. McKay, Jr., 971 Pierce St., Birmingham, MI (US) 48009

( * ) Notice: Subject to any disclaimer, the term of this patent is extended or adjusted under 35 U.S.C. 154(b) by 437 days.

(21) Appl. No.: 09/271,232

(22) Filed: Mar. 17, 1999

Related U.S. Application Data

(63) Continuation-in-part of application No. 09/126,528, filed on Jul. 30, 1998, now abandoned.

(51) Int. Cl.$^7$ ................................................. G01S 5/14
(52) U.S. Cl. ........................... 342/357.07; 342/357.08; 342/357.1
(58) Field of Search .................. 342/357.07, 357.09, 342/357.1, 386; 455/521; 340/573.1, 992, 686.1; 379/37, 38, 45

(56) References Cited

U.S. PATENT DOCUMENTS

| | | | |
|---|---|---|---|
| 5,408,238 A | | 4/1995 | Smith .......................... 342/357 |
| 5,418,537 A | | 5/1995 | Bird ........................... 342/357 |
| 5,475,597 A | * | 12/1995 | Buck ........................... 340/988 |
| 5,550,551 A | * | 8/1996 | Alesio ......................... 342/457 |
| 5,576,716 A | | 11/1996 | Sadler ......................... 342/357 |
| 5,629,678 A | | 5/1997 | Gargano et al. ............. 340/573 |
| 5,652,570 A | | 7/1997 | Lepkofker ................... 340/573 |
| 5,703,598 A | * | 12/1997 | Emmons ................ 342/357.07 |
| 5,754,136 A | * | 5/1998 | Kojima et al. ......... 342/357.07 |
| 5,793,813 A | * | 8/1998 | Cleave ......................... 375/259 |
| 5,812,087 A | * | 9/1998 | Krasner ....................... 701/213 |
| 5,852,401 A | * | 12/1998 | Kita ............................. 340/539 |
| 5,914,675 A | * | 6/1999 | Tognazinni .................. 340/989 |
| 5,918,180 A | * | 6/1999 | Dimino ........................ 455/456 |
| 5,969,673 A | * | 10/1999 | Bickley et al. ........ 342/357.09 |

FOREIGN PATENT DOCUMENTS

| | | | | |
|---|---|---|---|---|
| CA | 2133673 | * | 4/1996 | ........... H04B/7/185 |

* cited by examiner

Primary Examiner—Gregory C. Issing
(74) Attorney, Agent, or Firm—Gifford, Krass, Groh, Sprinkle, Anderson & Citkowski, P.C.

(57) ABSTRACT

An object locator device is disclosed for use in conjunction with both a GPS satellite system and a two-way communication satellite. The object locating system includes a mobile unit physically connected to the object to be located. The mobile unit includes a satellite communication transceiver capable of receiving and transmitting encoded signals. A decoder is associated with the satellite communication transceiver for decoding a unique signal associated with that mobile unit and for generating an activation signal upon receipt of the unique signal. The mobile unit further includes a GPS receiver which is activated in response to the receipt of the unique signal so that the GPS receiver generates a position signal representative of the position of the mobile unit. The output signal from the GPS receiver is connected as an input signal to the satellite communication transceiver such that the satellite communication transceiver transmits the.position signal to a base station on the communication satellite. The base station physically separated from the remote unit is operable to both transmit the unique signal to the communication satellite in order to activate the mobile unit as well as for receiving the position signal from the communication satellite following activation. The base station creates a display representative of the location of the mobile unit. Preferably, this display signal is transmitted via a telephone line and modem to a computer which generates the display on a computer monitor. Energy conservation algorithms including periodic activation of the satellite communication transceiver as well as activation of the satellite communication transceiver only when the position of the mobile unit has changed more than a threshold amount between periodic signals is disclosed.

6 Claims, 5 Drawing Sheets

OBJECT LOCATION SYSTEM

RELATED APPLICATION

This application is a continuation-in part of U.S. patent application Ser. No. 09/126,528 filed Jul. 30, 1998, now abandoned and entitled "Object Location System".

BACKGROUND OF THE INVENTION

I. Field of the Invention

The present invention relates to a system for physically locating mobile objects.

II. Description of the Prior Art

There are many situations where it is highly desirable to physically locate missing objects. Such missing objects can comprise, for example, stolen articles, such as a stolen car, as well as animate objects such as pets, children and mentally incapacitated persons.

There have been a number of previously known systems for locating missing objects and many of these previously known systems rely upon the GPS satellite system currently in place in space. As is well known, the GPS satellite system generates signals such that a ground base GPS receiver is capable of receiving the GPS signal from the GPS satellite and thereafter generating a signal representative of the latitude and longitude of the GPS receiver. Such previously known systems then transmit the GPS signal to a local radio receiver either by local radio communication or by cellular phone.

One major disadvantage of these previously known systems is that, since the mobile unit attached to the object to be located only generates a local radio signal, in some cases, the actual mobile unit is outside of the receiving range of the local radio receiver. Even in the event that the mobile unit utilizes a cellular phone as the radio transmitter, there are still many areas that are still inaccessible by cellular telephones.

A still further disadvantage of these previously known systems is that such systems lack a convenient means for utilizing the latitude and longitudinal signal from the GPS receiver in order to identify the location of the missing object. As a result, specialized personnel have been previously required in order to convert the signal from the GPS receiver into meaningful information. This, in turn, increases not only the cost but the convenience of the previously known systems.

SUMMARY OF THE PRESENT INVENTION

The present invention provides an object locating system which overcomes the above-mentioned disadvantages of the previously known systems.

In brief, the system of the present invention comprises a mobile unit physically connected to the object to be located. This mobile unit, in turn, includes a communication satellite transceiver capable of receiving and transmitting encoded messages. A decoder is associated with the transceiver for decoding a unique signal associated with the mobile unit, such as a telephone number, and for generating an activation signal upon receipt of the unique signal.

The mobile unit further includes a GPS receiver. Once the unique signal is received by the transceiver, the decoder activates the GPS receiver which receives the position signal from the GPS satellite representative of the latitude and longitudinal position of the mobile unit. This position signal is then coupled as an input signal to the satellite transceiver such that the satellite transceiver transmits the position signal to a base station via a communication satellite.

The base station includes both means for selectively transmitting the unique signal to the communication satellite as well as for receiving the position signal from the communication satellite. The base station then includes means for utilizing the position signal from the satellite communication transceiver for generating a display representative of the physical position of the mobile unit.

In the preferred embodiment of the invention, the base station is operated by telephone communication services and communicates with the end user via telephone lines. Thus, in order to activate the mobile unit, the end user dials a telephone number containing the unique signal which is transmitted to the mobile unit via the base station and the communication satellite. Conversely, in order to provide a display representative of the position of the mobile unit, the base station preferably generates a coded signal via telephone lines to a computer via a modem connected to the telephone line. The computer is programmed to receive the encoded position signal and then generate a display on a monitor associated with the computer representative of the physical position of the missing object.

Since the system of the present invention relies on satellite communication between the Earth and the missing object, the previously known problem of the missing object being outside the range of the local radio receiver is completely eliminated. Furthermore, since the present invention preferably communicates with the end user by a personal computer, an easy to use map display is generated on the computer monitor which eliminates the previously known need for specialized personnel to convert the position signal from the GPS receiver into meaningful information.

Direct communication between the mobile unit and the communication satellite requires a substantially unobstructed, direct line of sight signal path. In many situations, however, such a direct line unobstructed signal path is simply unavailable.

Consequently, the base station preferably includes memory storage means, such as random access memory available to a computer system, for storing the last known position signal of the mobile unit. Consequently, even in the event of a blocked signal from the mobile unit to the satellite communication system, the base station, utilizing the previously stored position of the mobile unit, will report the previously stored position of the mobile unit to the end user. While such a system is inherently inaccurate, at least the last known position of the mobile unit, as well as the time that that last known position was obtained by the base station, can be determined to provide an approximation of the position of the mobile unit.

In a modification to the preferred embodiment of the present invention, the mobile unit includes memory storage means, such as random access memory accessible by a microprocessor, for storing the last determined position of the mobile unit from the GPS receiver on a periodic basis, e.g. once every fifteen minutes. When the new position for the mobile unit is received from the GPS receiver in the mobile unit, the microprocessor calculates the change in position between the last stored position of the mobile unit and the currently determined position of the mobile unit from the GPS receiver. Only when the difference between the last stored position of the mobile unit and the current position of the mobile unit as determined from the signals received by the GPS receiver exceeds a predetermined threshold, e.g. 100 yards, does the microprocessor activate the satellite communication transmitter to transmit the current position of the mobile unit to the communication satellite. This algorithm thus achieves significant energy saving since the satellite communication transmitter in the mobile unit may be activated only sporadically, if at all, as long as movement of the mobile unit is less than the threshold amount.

In a still further modification to the present invention, the GPS receiver remains activated on a continuous basis. A microprocessor analyzes the output signal and signal strength from the GPS receiver to determine if a blocked signal condition exists. If so, activation of the satellite communication transmitter in the mobile unit is prevented thus minimizing energy consumption by the mobile unit. However, when the microprocessor determines that the blocked signal condition has been eliminated, the microprocessor immediately activates the satellite communication transmitter in the mobile unit to thereby update the position of the mobile unit at the base station. Such updating, furthermore, is preferably done on a periodic basis, e.g. once every fifteen minutes.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
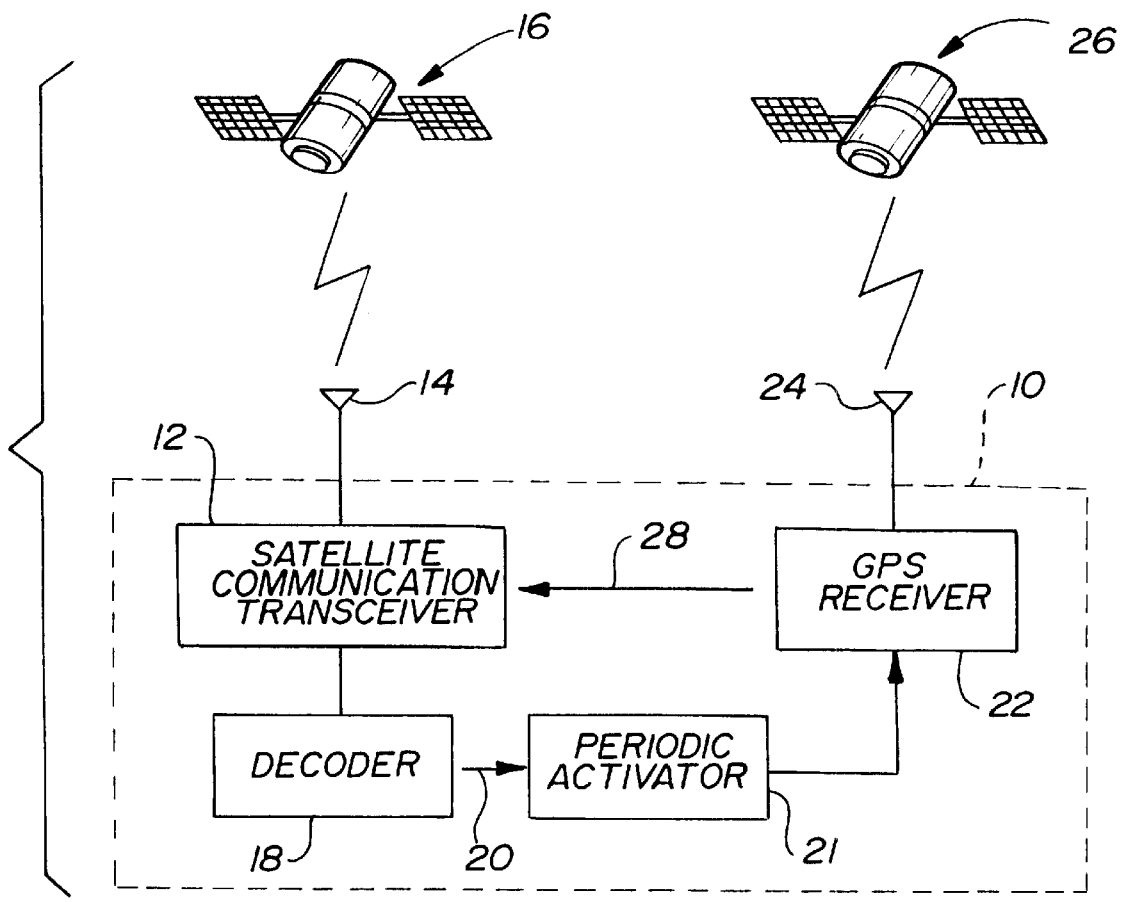
FIG. 1 is a block diagrammatic view illustrating a mobile unit in communication with both a communication satellite and a GPS satellite.

With reference first to FIG. 1, a block diagrammatic view of a preferred embodiment of a mobile unit 10 of the present invention is there shown. The mobile unit 10 is associated with the object to be located, for example, a child, pet, mentally incapacitated person or an inanimate object.

The mobile unit 10 includes a satellite communication transceiver 12 having an antenna 14 to provide two-way communication between the transceiver 12 and a communication satellite 16. The communication satellite 16 is typically operated by telephone service companies and provide two-way radio communications between the Earth and the satellite in the well-known fashion.

Still referring to FIG. 1, a decoder 18 is associated with the transceiver 12 in order to detect a coded signal unique to the particular mobile unit 10, such as a telephone number. Once the decoder 18 detects the unique signal, the decoder 18 generates a signal on its output line 20 to a GPS receiver 22.

The GPS receiver 22 communicates via an antenna 24 with the GPS satellite system 26 such that, when activated, the GPS receiver 22 generates an output position signal on its output line 28 representative of the latitude and longitude of the mobile unit 10.

The position signal on the output line 28 from the GPS receiver 22 is coupled as an input signal to the transceiver 12. The transceiver 12 then transmits the GPS position signal to the communication satellite 16 which, in turn, retransmits the signal to a base station 40 on Earth.

Figure 2:
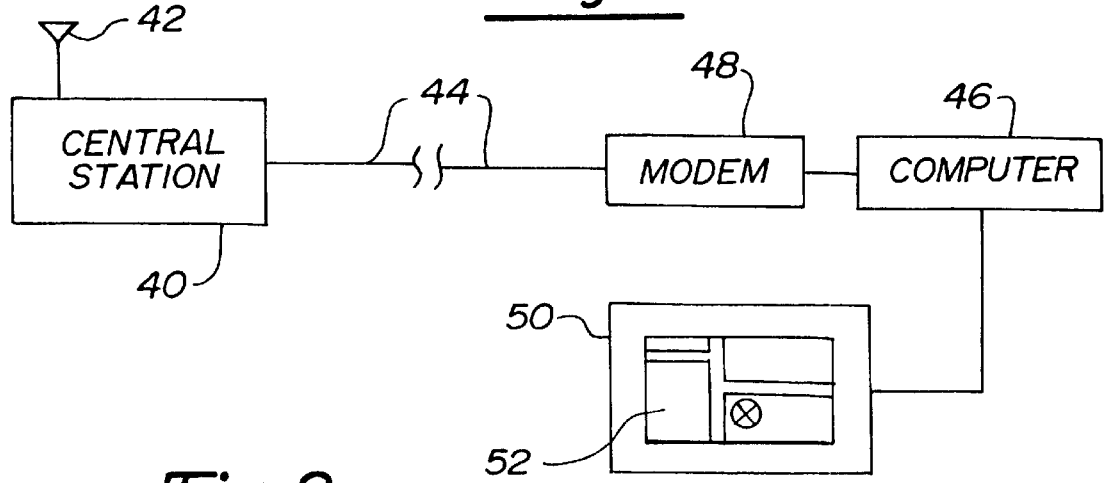
FIG. 2 is a block diagrammatic view illustrating the base station and the communication between the base station and an end user.

With reference now to FIG. 2, the base station 40 provides two-way communication with the communication satellite 16 via a radio transceiver and antenna 42. The base station 40 is operated by the telephone service utilities and communicates with the end users by telephone lines 44.

Preferably the end user, i.e. the person desiring to locating the missing object, communicates with the central station 40 via a personal computer 46 and modem 48. A computer monitor 50 is associated with the personal computer 46 in the conventional fashion.

In operation, when an end user desires to locate a missing object, the end user dials, via the computer 46, a telephone number containing the unique signal. This unique signal, i.e. the telephone number itself, is transmitted to the transceiver 12 in the previously described fashion. Upon receipt, as has been previously described, the mobile unit 10 generates a position signal back to the central station 40 which in turn is communicated to the computer 46 via the modem 48.

The computer 46 is programmed to create a map display 52 on the monitor 50 representative of the physical location of the missing object.

Although the computer 46 and monitor 50 is preferably associated with the end user desiring to locate the missing object, alternatively the computer 46 and monitor 50 can be operated by a service company which then communicates with the end user in any conventional fashion, i.e. by telephone communication.

With reference again to FIG. 1, a modification to the preferred embodiment is there shown in which a periodic activator 21 is interposed between the decoder 18 and the GPS receiver 22. The periodic activator 21, upon receipt of the signal from the decoder 18 periodically activates the GPS receiver 22 over a preset period of time, e.g. ten minutes. The periodic activator 21 thus enables easy tracking of the missing object.

In order to achieve proper communication between the satellite communication transceiver 12 and the communication satellite 16, a clear and unobstructed view between the mobile unit 10 and satellite 16 must exist. Otherwise, a blocked signal condition will result and the communication satellite 16 will not receive the position signal from the mobile unit 10. In such a situation, however, it is still necessary to track, as accurately as possible, the position of the mobile unit.

Figure 4:
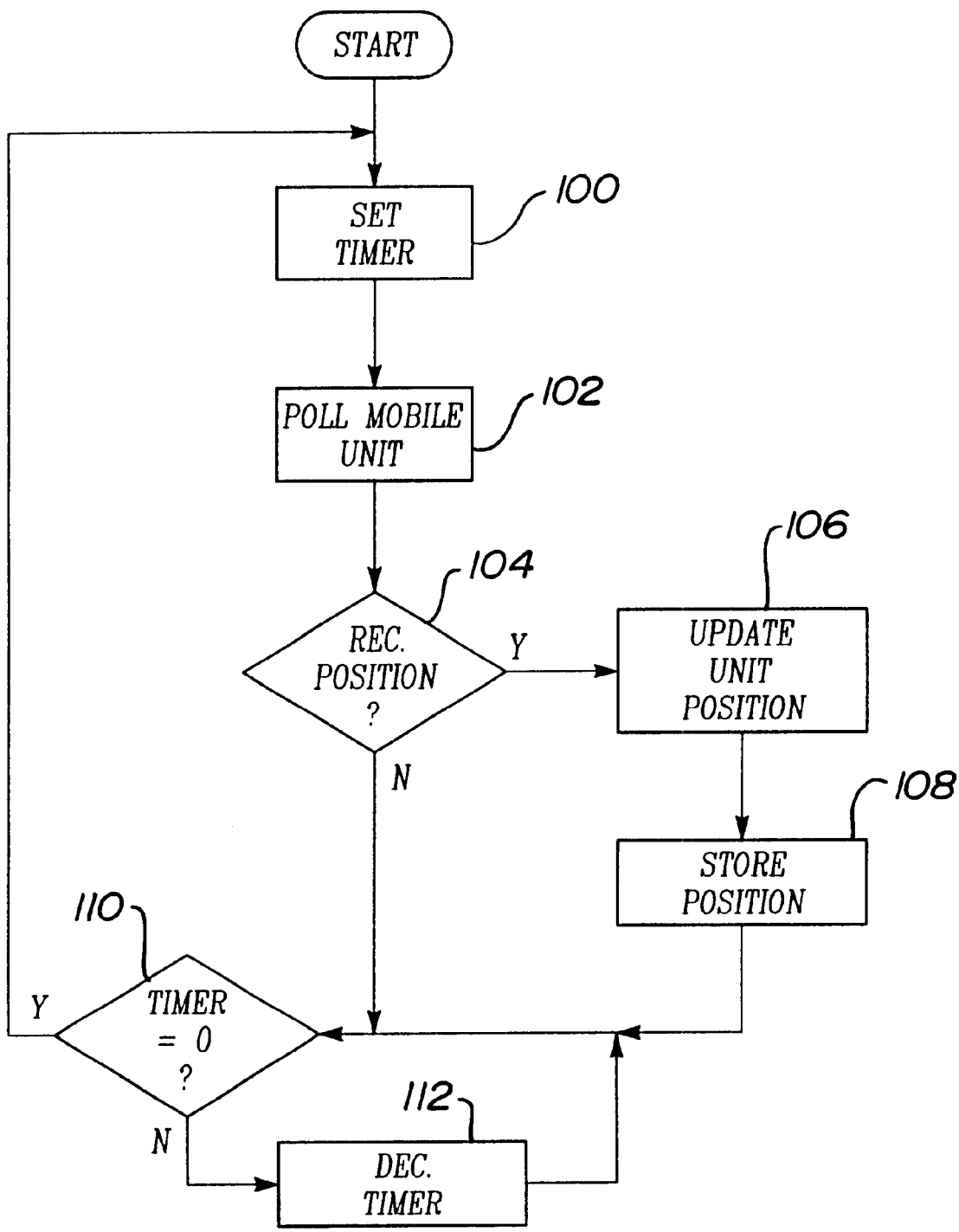
FIG. 4 is a flow chart illustrating yet a further modification to the preferred embodiment of the present invention.

With reference now to FIG. 4, an algorithm for the base station computer 46 (FIG. 2) which compensates for a blocked signal condition is disclosed. At step 100, a timer is first set to a predetermined amount, e.g. fifteen minutes. Step 100 then branches to step 102.

At step 102, the base station transmits a signal to the communication satellite 16 to poll the mobile unit 10. Step 102 then branches to step 104 where the base station receives the position signal from the mobile unit 10 as relayed by the communication satellite 16.

If such a signal is received by the base station, step 104 branches to step 106 where the base station computer 46 receives the position signal from the satellite 16 and then stores this position signal at the base station at step 108. Step 108 then branches to step 110 which determines if the timer signal has expired. If not, step 110 loops to step 112 where the timer counter is decremented until the timer counter reaches zero. At that time, step 110 branches to step 100 where the timer is reset and the above identified process is repeated.

Conversely, in the event that the signal is blocked between the mobile unit 10 and the communication satellite 16, step 104 will not receive the position signal after polling from the communication satellite 16. In this event, step 104 merely branches immediately to step 110 where the timer is decremented in the previously described fashion. However, in this latter event, the previously received position signal from the mobile unit 10 is stored on the base station computer 46, preferably in random access memory, and this previously stored position is provided as an output signal to the end user. As such, the last known received position signal from the mobile unit 10 is always available to the end user thus providing at least an approximation of the location of the mobile unit.

Figure 3:
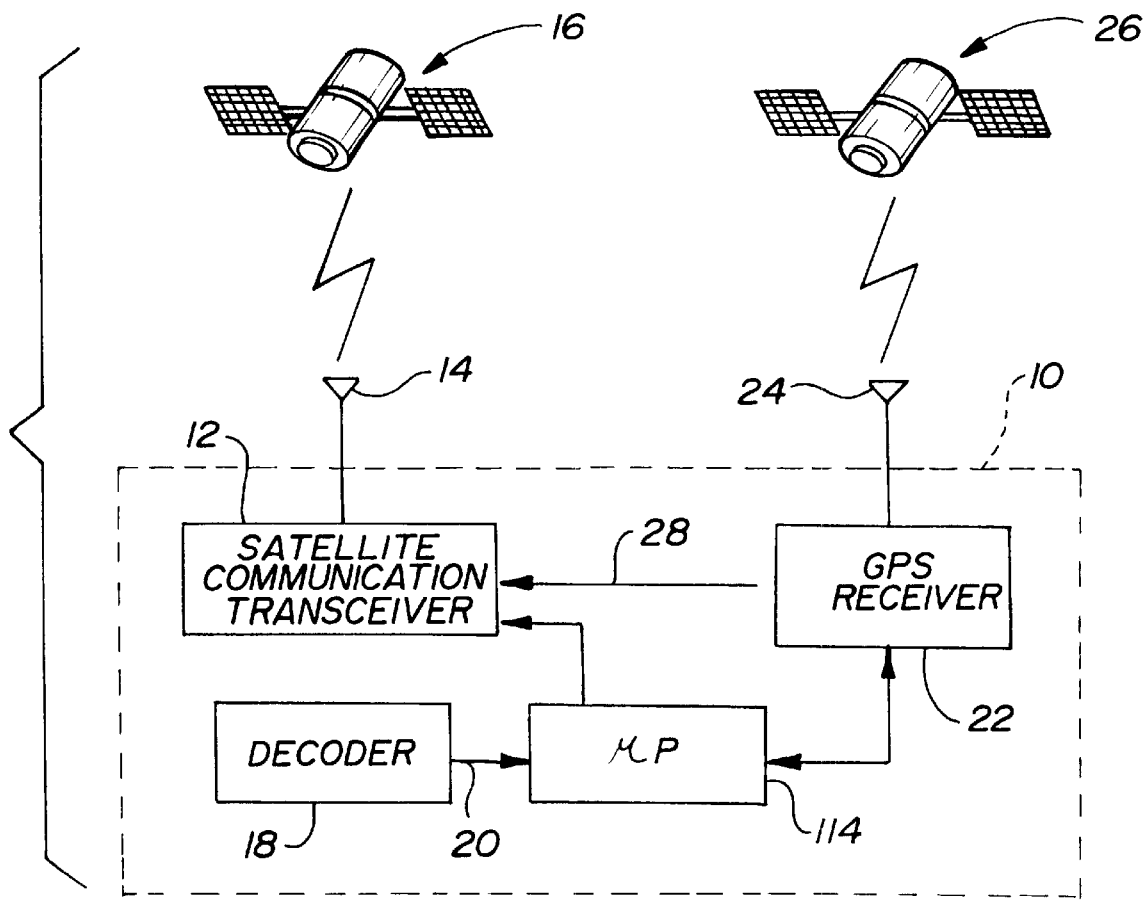
FIG. 3 is a block diagrammatic view similar to FIG. 1 but illustrating a modification to the preferred embodiment of the present invention.

With reference now to FIG. 3, a modification of the mobile unit 10 is there shown in which a microprocessor 114 controls the activation of both the GPS receiver 22 as well as the satellite communication transceiver 12. Furthermore, although the GPS receiver 22 exhibits only very low energy consumption, the satellite communication transceiver 12, at least in the transmit mode, requires substantially more electrical power. Thus, in order to conserve energy consumption, typically from batteries, at the mobile unit, it is necessary to minimize activation of the satellite communication transceiver, at least in the transmit mode.

Figure 5:
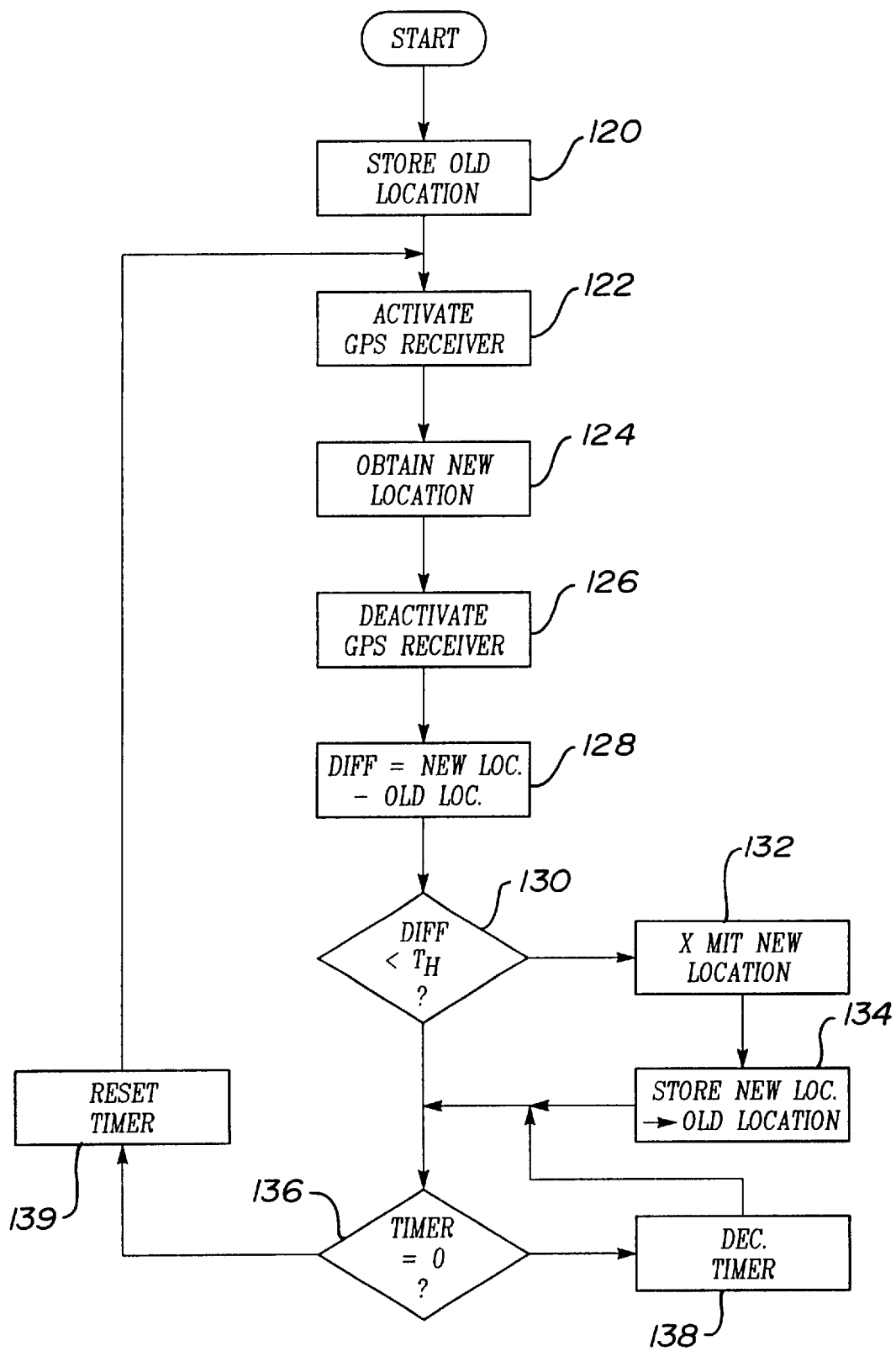
FIG. 5 is a flow chart illustrating still a further modification of the preferred embodiment of the present invention illustrated in FIG. 3.

With reference now to FIG. 5, an algorithm for the microprocessor 114 in the mobile unit for conserving energy consumption is there shown. At step 120, the microprocessor 114 activates the GPS receiver 22 to receive the current location of the mobile unit 10. The current location or position of the mobile unit 10 is then stored in random access memory accessible to the microprocessor 114. Step 120 then branches to step 122.

At step 122, the microprocessor 114 activates the GPS receiver 22 and then branches to step 124 where a new or current location of the mobile unit 10 is received from the GPS receiver 22. Step 124 then branches to step 126 which optionally deactivates the GPS receiver 22 to conserve additional power. Step 126 then branches to step 128.

At step 128, the microprocessor 114 determines the difference in length between the old location stored at step 120 and the new location of the mobile unit 10 obtained at step 124. This difference DIFF is then stored as a variable by the microprocessor 114. Step 128 then branches to step 130.

At step 130 the microprocessor 114 compares the difference DIFF with a preset threshold TH representative of a preset linear distance, e.g. 100 yards. If the difference DIFF is greater than the threshold signal $T_H$, indicative that the mobile unit has moved an amount greater than the threshold amount, step 130 branches to step 132 where the microprocessor 114 activates the satellite communication transceiver 12 to transmit the new position signal to the communication satellite 16. Step 132 then branches to step 134 where the new position, i.e. the position just transmitted at step 132, is stored as the old position signal. Step 134 then branches to step 136.

At step 136, a timer counter is compared to zero. If greater than zero, step 136 branches to step 138 where the timer counter is decremented and step 138 then branches back to step 136. In this fashion, steps 136 and 138 introduce a preset timer delay, e.g. fifteen minutes, between the time successive GPS signals are received and analyzed by the microprocessor 114. Once the timer counter reaches zero, indicative that the time period has elapsed, step 136 branches to step 138 where the timer counter is reset and then back to step 122 where the above process is repeated.

The algorithm in FIG. 5 serves to greatly enhance energy conservation by activating the satellite communication transmitter only when the mobile unit has moved more than a predetermined amount $T_H$, e.g. 100 yards. Consequently, in a situation where the mobile unit remains in a confined area, i.e. the typical situation, no activation of the satellite communication transmitter occurs thereby conserving energy.

In some situations the signal path between the mobile unit 10 and the communication satellite 16 is blocked. In these situations, it is important for the mobile unit 10 to immediately transmit its position once the blocked signal condition ceases.

Figure 6:
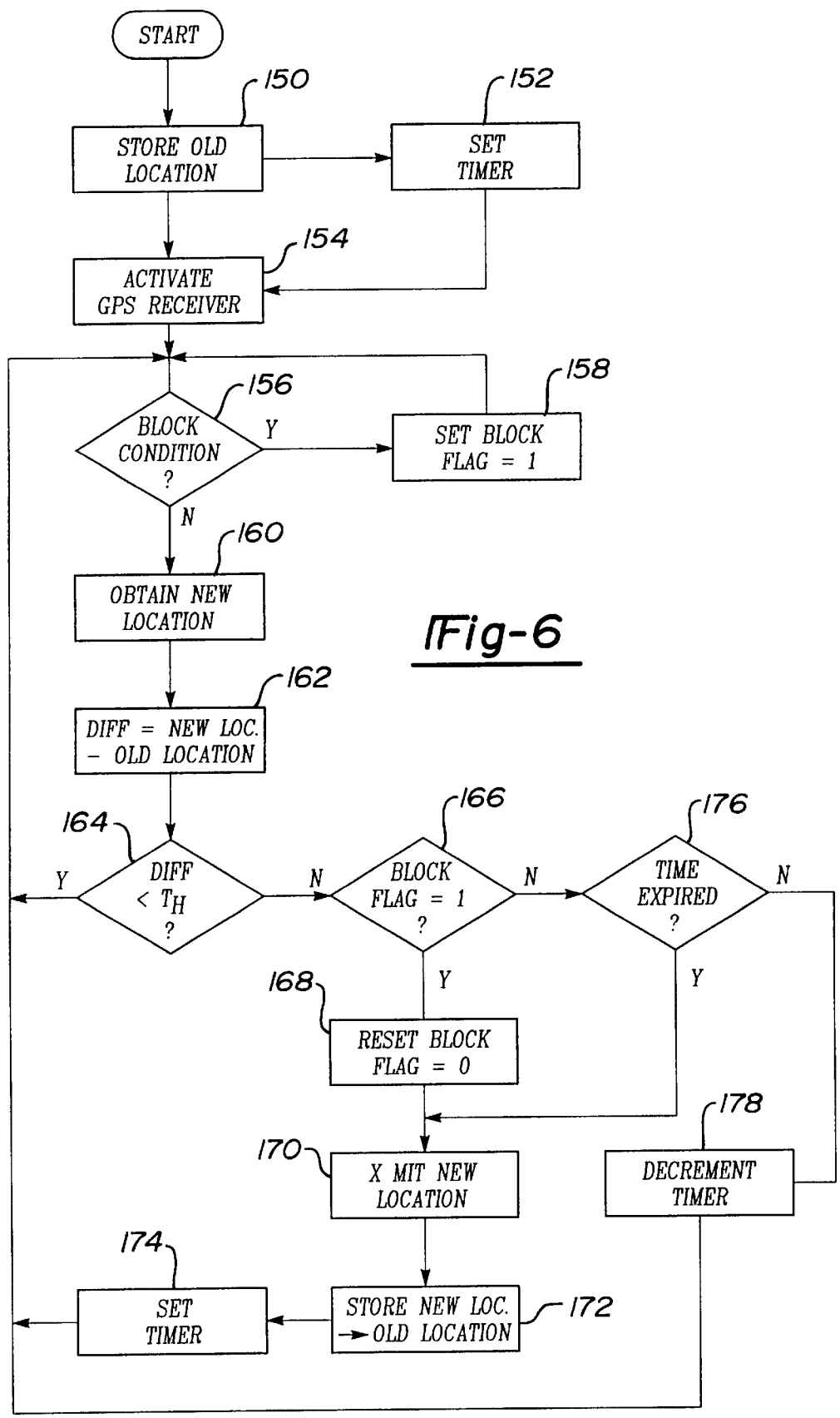
FIG. 6 is a flow chart illustrating yet a further modification to the preferred embodiment of the invention as illustrated in FIG. 3.

With reference then to FIG. 6, an algorithm for the mobile station microprocessor 114 is there shown which compensates for a blocked signal condition. At step 150 the microprocessor 114 activates the GPS receiver 22 to obtain and store the current location of the mobile unit 10. Step 50 then branches to step 152 where a timer counter is set equal to a preset timer interval, e.g. fifteen minutes. Step 152 then branches to step 154 where the microprocessor 114 activates the GPS receiver 22. Step 154 then branches to step 156.

At step 156, the microprocessor 114 inputs both the signal strength as well as the number of satellites accessed by the GPS receiver 22 to determine if a blocked signal condition exists between the GPS receiver and the GPS satellite 26. If such a blocked condition exists between the GPS satellite 26 and GPS receiver 22, in all likelihood such a blocked signal condition will also exist between the satellite communication transceiver 12 and the communication satellite 16.

In the event that a blocked condition exists, step 156 branches to step 158 where the microprocessor 114 sets a blocked flag equal to one. Step 158 then branches back to step 156. As such, steps 156 and 158 continually loop until termination of the blocked signal condition. Upon termination of the blocked signal condition, step 156 branches to step 160 where the microprocessor 114 receives the new position signal from the GPS receiver. Step 160 then branches to step 162 where the difference DIFF between the new location and the previously stored location is determined. Step 162 then branches to step 164.

At step 164 the difference DIFF is compared with a preset threshold $T_H$. In the event that the difference DIFF is less than the threshold $T_H$, step 164 branches back to step 156 where the above process is repeated. Conversely, if the difference DIFF is greater than the threshold signal $T_H$, indicative that the mobile unit 10 has moved more than the preset threshold distance, step 164 instead branches to step 166.

At step 166, the microprocessor 114 determines if the blocked flag is set to one, i.e. indicative of a previous blocked signal condition. If so, step 166 branches to step 168 where the blocked flag is reset to zero and then branches to step 170 where the microprocessor 114 activates the satellite communication transceiver to transmit the new mobile unit position to the communication satellite 16. Step 170 then branches to step 172 where the new position is stored as the old position by the microprocessor 14. Step 172 then branches to step 174 where the periodic timer is reset, e.g. fifteen minutes, and step 174 then branches to step 156 where the above process is repeated.

Conversely, in the event that the blocked flag is not set to one, step 166 instead branches to step 176 which determines if the time set by the timer has expired. If not, step 176 branches to step 178 where the timer counter is decremented and step 178 then branches back to step 156 where the above process is repeated.

Conversely, in the event that the timer has expired, step 176 instead branches to step 170 where the microprocessor activates the satellite communication transceiver 12 to transmit the new position to the communication satellite in the previously described fashion. Likewise, the current position of the mobile unit is stored as the old position at step 172 and the timer is reset at step 174 as has been previously described.

From the foregoing, it can be seen that the algorithm depicted in FIG. 6 not only provides for energy conservation by transmitting the position of the mobile unit only when the mobile unit moves a distance greater than a predetermined amount, but also insures accuracy of the system by detecting a blocked signal condition and immediately transmitting the position of the mobile unit whenever that blocked signal condition terminates. As such, the most current position for the mobile unit is always maintained at the base station.

Having described my invention, it can be seen that the present invention provides a simple and yet highly effective system for locating missing objects. Having described my invention, however, many modifications thereto will become apparent to those skilled in the art to which it pertains without deviation from the present invention as defined by the scope of the appended claims.

I claim:

1. For use in conjunction with a GPS satellite system and a two way satellite communication system, an object locating system comprising:
    a mobile unit physically connected to the object to be located, said mobile unit comprising
        a satellite communication transceiver capable of receiving and transmitting encoded signals,
        decoding means associated with said satellite communication transceiver for decoding a unique signal associated with said mobile unit and for generating an activation signal upon receipt of said unique signal,
        a GPS receiver,
        means for activating said GPS receiver in response to said activation signal so that said GPS receiver generates a current position signal representative of the position of said mobile unit, and
        means for connecting said current position signal as an input signal to said satellite communication transceiver so that said satellite communication transceiver transmits said position signal, wherein said connecting means comprises means for storing a position signal, means for comparing the current position signal with a previously stored position signal means for generating a difference signal representative thereof and for connecting said current position signal as an input signal to said satellite communication transceiver only when said difference signal exceeds a preset threshold, and means for storing the current position signal as said previously stored position signal, and
    a base station comprising
        means for selectively transmitting said unique signal to said communications satellite,
        means for receiving said position signal from said satellite communication transceiver, and
        means for creating a display representative of the location of said mobile unit.

2. The invention as defined in claim 1 wherein said activating means comprises means for periodically activating said GPS satellite receiver upon receipt of said unique signal.

3. The invention as defined in claim 1 wherein said display creating means comprises a computer operatively connected to a monitor, and a modem operatively connected to said computer for connecting said computer to said base station via a telephone line, said computer being programmed to receive said position signal and thereafter generate a visual display on said monitor representative of the position of said mobile unit.

4. The invention as defined in claim 1 wherein said means for storing said position signal comprises a microprocessor.

5. The invention as defined in claim 1 and comprising means for periodically activating said GPS receiver.

6. The invention as defined in claim 1 and comprising means in said mobile unit for determining a blocked signal condition from the communication satellite, and means for activating said satellite communication transceiver to transmit said position signal immediately upon termination of said blocked signal condition.

* * * * *